United States Patent [19]

Huyer

[11] Patent Number: 4,936,623
[45] Date of Patent: Jun. 26, 1990

[54] OPEN ROOF CONSTRUCTION FOR A VEHICLE

[75] Inventor: Johannes N. Huyer, Velserbroek, Netherlands

[73] Assignee: Vermeulen-Hollandia Octrooien II B.V., Netherlands

[21] Appl. No.: 336,246

[22] Filed: Apr. 11, 1989

[30] Foreign Application Priority Data

Apr. 21, 1988 [NL] Netherlands .................. 8801028

[51] Int. Cl.$^5$ .............................. B60J 7/047
[52] U.S. Cl. ................... 296/220; 296/221; 296/222; 49/465
[58] Field of Search ............ 296/214, 220, 216, 218, 296/221, 222, 223; 49/465

[56] References Cited

U.S. PATENT DOCUMENTS

| | | | |
|---|---|---|---|
| 3,005,226 | 10/1961 | Werner | 296/216 X |
| 4,671,564 | 6/1987 | Sumida et al. | 296/214 |
| 4,844,534 | 7/1989 | Boots | 296/216 X |

FOREIGN PATENT DOCUMENTS

| | | | |
|---|---|---|---|
| 772198 | 10/1934 | France | 296/222 |
| 145637 | 5/1931 | Switzerland | 296/222 |

Primary Examiner—Margaret A. Focarino
Assistant Examiner—Gary C. Hoge
Attorney, Agent, or Firm—Kinney & Lange

[57] ABSTRACT

An open roof construction for a vehicle having a roof opening (1), has an at least partially transparent panel (3) for selectively closing or at least partially opening the roof opening (1), and a sun shade (4) being slidable under the panel (1) along guide rails (6) through slide means (5) provided on either side of the sun shade (4). The slide means (5) is movable with respect to the sun shade (4) so as to bring the slide (5) into or out of engagement with the respective guide rail (6). The slide (5) remains freely movable with respect to the sun shade (4) in the mounted position thereof and is loaded in the direction to the respective guide rail (6) by a spring element (9).

6 Claims, 2 Drawing Sheets

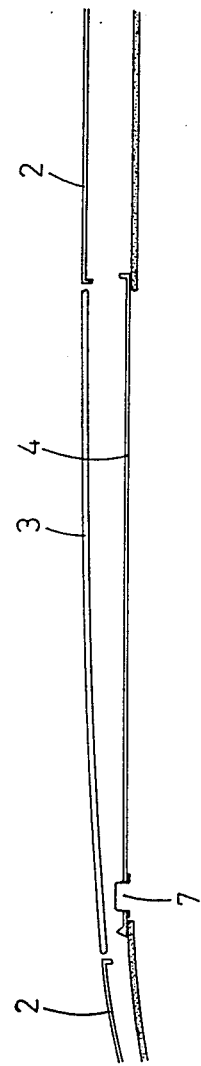
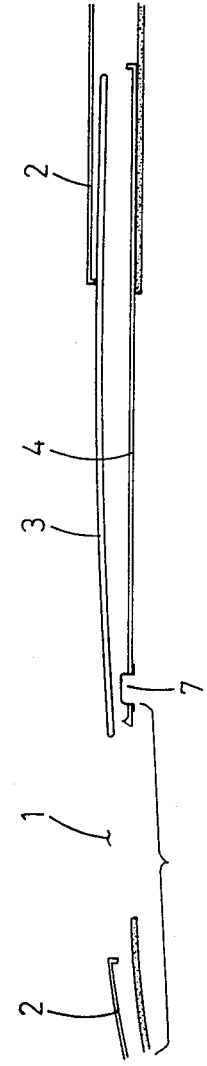
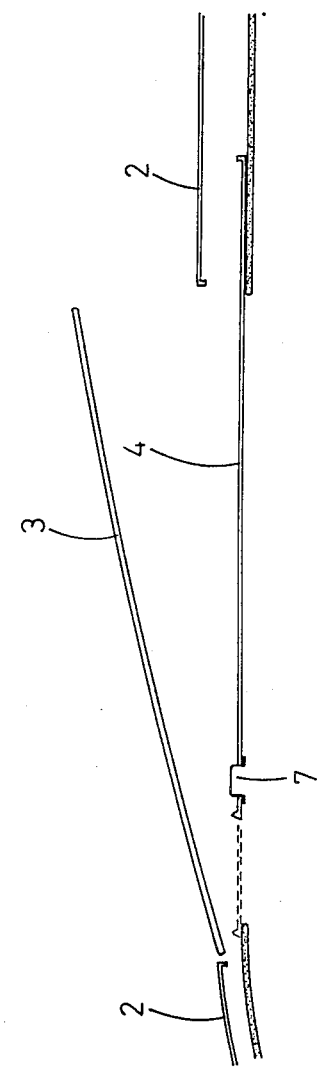

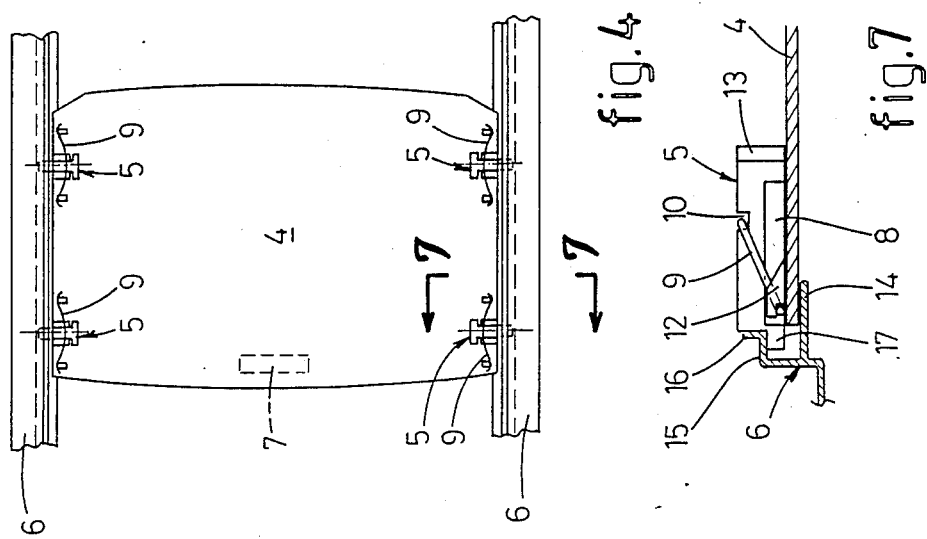
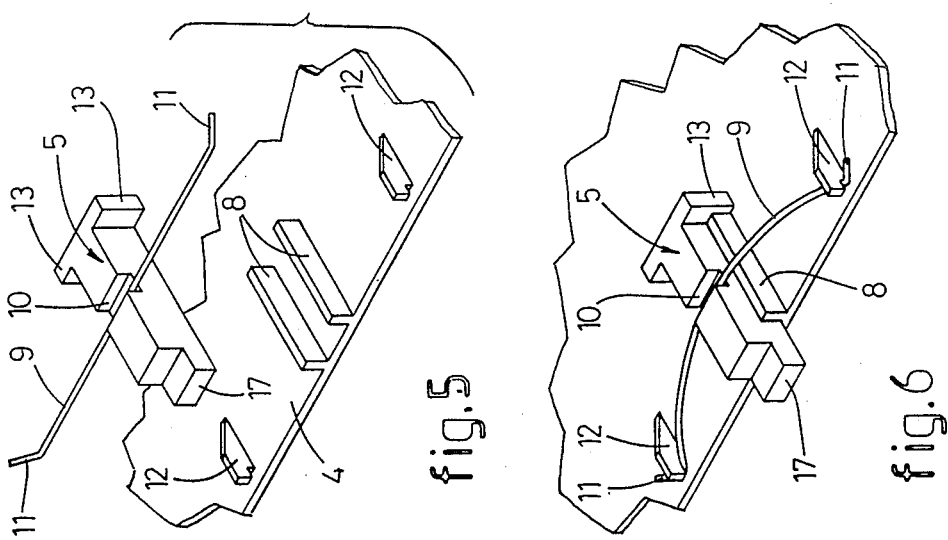

OPEN ROOF CONSTRUCTION FOR A VEHICLE

The invention relates to an open roof construction for a vehicle having a roof opening, comprising an at least partially transparent panel for selectively closing or at least partially opening the roof opening, and a sun shade being slidable under the panel along guide rails through at least one slide means provided on either side of the sun shade, the slide means being movable with respect to the sun shade so as to bring the slide means into or out of engagement with the respective guide rail.

In a known embodiment of such an open roof construction the sun shade is provided on both longitudinal sides with two slide means fixed to the sun shade by means of screws and nuts. The screws project through the sun shade having, for this purpose, holes that are elongated in transverse direction. As a consequence thereof the slide means are adapted to be adjusted a distance with respect to the sun shade in order to bring them into or out of engagement with the respective guide rail. As a result it is quite easy to mount the sun shade in the guide rails when the open roof construction is assembled. After the sun shade has been positioned with the slide means in the respective guide rails the screws or nuts are tightened so that the slight means are fixed to the sun shade.

The object of the present invention is to provide an open roof construction of the type mentioned in the preamble, wherein it is even more easy to mount the sun shade and wherein a faultless assembly is ensured.

For this purpose the open roof construction according to the invention is characterized in that the slide means on at least one side of the sun shade remains freely movable with respect to the sun shade in the mounted position thereof and is loaded in a direction to the respective guide rail by means of a spring element.

In this way it is only necessary for mounting the sun shade to manually move the slide means opposite to the spring pressure, whereafter it is possible to bring the slide means into the guide rail. When the slide means is released there upon, the spring element urges the respective slide means to the proper position in the guide rail so that the sun shade is always properly mounted and is prevented from rattling or loosening as a consequence of an inaccurate assembly or production tolerances. The spring load of the slide means in the direction to the guide rail further ensures that a certain pressure is exerted by the slide means on the guide rail. This has the advantage that there is caused a frictional resistance between the sun shade and the guide rail preventing the sun shade from an undesirable sliding movement when the vehicle accelerates or decelerates, e.g. when it is braked. Thus there are no additional measurements required therefore. The spring load of the spring element can be chosen such that there is prevented an undesired displacement of the sun shade on one hand and there is ensured an easy and light operation of the sun shade on the other hand.

In the embodiment of the open roof construction wherein the slide means is shiftable substantially in the plane of the sun shade, it is favourable according to the invention if there is provided a rod-like spring as spring element between the slide means and the sun shade.

In this way it is possible to have a slide means and a spring element with a very simple and cheap structure.

Furthermore it is advantageous when the spring element exerts force components on the slide means parallel to the sun shade (toward the guide rail) as well as in a direction toward the sun shade.

As a result thereof, the spring element also serves as a securing means for the slide means so that no seperate means for securing the slide means onto the sun shade are necessary, while the spring element ensures a permanent rattle-free engagement between the slide means and the sun shade.

In case a rod-like spring is used this can easily be realized when the rod-like spring engages the sun shade with its ends and is guided over the slide means at a greater distance from the sun shade between its ends.

A very simple embodiment of the slide means is characterized in that the slide means comprises an elongated pad having parallel longitudinal sides, the pad being guided between guiding ribs on the sun shade.

The invention will hereafter be elucidated with reference to the drawing which shows an embodiment of the open roof construction according to the invention by way of example.

FIG. 1–3 are very schematic longitudinal sectional views of an open roof construction, in which several positions of the panel and the sun shade are illustrated.

FIG. 4 is a plan view of the sun shade according to the invention in the assembled condition thereof.

FIG. 5 is an enlarged exploded view of a detail of the sun shade according to FIG. 4.

FIG. 6 shows the same detail as FIG. 5 wherein, however, the parts are shown in their assembled position.

FIG. 7 is a sectional view along the line VII—VII in FIG. 4, on an enlarged scale.

FIG. 1–3 show an open roof construction for a vehicle having an opening 1 in its fixed roof 2. This open roof construction includes a panel 3 made of a transparant material, such as glass, and a sun shade 4 mounted under said panel 3.

The panel 3 is adapted to be moved from its closed position in the roof opening 1 (FIG. 1) into a downwardly pivoted position in which the panel 3 is able to be slid to a wholly or partially opened position under the fixed roof 2 (FIG. 2) and to be displaced from there in a reverse direction to the closed position. Furthermore, the panel 3 is adapted to be pivoted from the closed position into a rearwardly and upwardly inclined venting position (FIG. 3) and to be moved in a reverse direction from this venting position to the closed position.

The sun shade 4 may be moved, with the panel 3 in its closed position, back and forth between the front position and a rear position. When the panel 3 is slid backwardly under the fixed roof 2 the sun shade 4 is carried along backwardly by means of carrier means (not shown). In the venting position according to FIG. 3 it is also possible to move the sun shade 4 backwardly by hand.

From FIG. 4 it appears that the sun shade is provided on both longitudinal sides with two slide means 5, one near the front edge and one near the rear edge of the sun shade 4, said slide means 5 being in engagement with guide rails 6 extending in longitudinal direction of the vehicle for the sake of the sliding movement of the sun shade 4. In order to manually adjust the sun shade 4 it is provided near its front edge with a downwardly opening recess serving as hand grip 7 (cf. FIG. 1–3).

FIG. 5, 6 and 7 show the structure of one of the slide means 5 in detail. The slide means 5 consists of a generally rectangular pad 5 having two parallel longitudinal sides. The slide means is shiftably guided between two transverse guiding ribs 8 extending perpendicularly to the guide rails 6 and being provided on the sun shade 4, the guiding ribs 8 engaging the longitudinal sides of the slide means 5.

In the assembled position of the slide means 5 a rod-like spring 9, serving as a spring element, engages the slide means 5. For this purpose the slide means 5 has a transverse notch 10 on its upper side, in which the rod-like spring 9 is guided between its ends. The rod-like spring 9 has curved end parts 11 on those ends, with which the rod-like spring 9 engages under hook means 12 on the sun shade 4. Since the notch 10 in the slide means 5 is spaced with a larger distance from the adjacent edge of the sun shade 4 and from the plane of the sun shade 4 then the hook means 12 therefrom the rod-like spring 9, in its assembled position, is bent such that the rod-like spring 9 exerts a force on the slide means 5 that is directed to the adjacent edge of the sun shade 4 and consequently toward the respective guide rail 6, and toward the sun shade 4 (see also FIG. 7). In this way the rod-like spring 9 not only holds the slide means 5 under spring load against the guide rail 6, but also secures the slide means 5 on the sun shade 4. Lateral shoulders 13 at the end of the slide means 5 facing away from the respective guide rail 6 are adapted to engage the rear end of the guiding ribs 8 for the slide means 5 so as to limit the travel of the slide means 5 in transverse outward direction.

FIG. 7 shows the transverse section of the guide rail 6 for the slide means 5. The guide rail 6 comprises a section opened in the direction to the sun shade 4 and having a lower substantially horizontal flange 14 for supporting the sun shade 4 and an upper substantially horizontal flange 15 having an upwardly turned end part 16. The slide means 5 has at its end facing the guide rail 6 a nose 17 having smaller height then the remaining portion of the slide means 5. This nose 17 engages into the section of the guide rail 6 between the flanges 15 and 14 and engages the lower side of the flange 15 with its upper surface. The front surface of the slide means 5 above the nose 17 is in engagement with the upwardly turned end part 16 and is hold in contact therewith by the rod-like spring 9. As a result, when the sun shade 4 is slid, a friction between the upwardly turned end part 16 of the guide rail 6 and the slide means 5 occurs whereby a breaking action is exerted on the sun shade 4. This prevents the sun shade 4 from sliding forwardly in an undesired manner when the vehicle is breaked strongly. In the assembled condition of the sun shade 4 the longitudinal sides thereof are spaced from the bottem of the inwardly opened section of the guide rail 6.

The assembly of the sun shade 4 is as follows. In the non-assembled condition of the sun shade 4 the slide means 5 are in the maximally outwardly shifted position according to FIG. 6, in which the shoulders 14 thereof are in engagement with the guiding ribs 8. The slide means 5 on one longitudinal side of the sun shade 4 are then placed in the respective guiding rail 6 whereupon the slide means 5 on the opposite longitudinal side of the sun shade 4 are pushed manually against the spring pressure of the rod-like springs 9 inwardly away from the respective guide rail 6 thereby bringing the slide means 5 out of engagement with the respective guide rails 6 and enabling the sun shade 4 to be positioned on the lower flange 14 of the guide rail 6. The slide means 5 are then released whereby the noses 17 of the slide means 5 are urged by the rod-like springs 9 into the section of the guide rail 6 until the slide means 5 come into engagement with the upwardly turned end part 16 of the guide rail 6. The shoulders 13 at the end of the slide means 5 facing away from the guide rail 6 are then still spaced from the rear end of the guiding ribs 9 on the sun shade 4.

As will be clear from the forgoing description the invention provides an open roof construction for a vehicle of which the sun shade can easily be mounted without the risk of assembly failures, and the slide means, in their mounted position, remain freely shiftable relative to the sun shade and are urged against the guide rails under the load of a spring element thereby ensuring a faultless assembly. All this is obtained with a very simple structure of the slide means.

The invention is not restricted to the embodiment shown in the drawing by way of example, which is liable to different modifications within the scope of the invention. It is for instance possible to use the invention in other types of sun roofs, such as spoiler roofs or sliding roofs.

What is claimed is:

1. An open roof construction for a vehicle having a roof opening, comprising guide rails; an at least partially transparent panel for selectively at least partially opening and closing the roof opening, and a sun shade being slidable under the panel along the guide rails through at least one slide means provided on either side of the sun shade, the slide means on at least one side of the sun shade being movable with respect to the sun shade so as to bring the slide means selectively into and out of engagement with the respective guide rail during the assembly, and remaining freely movable with respect to the sun shade in a mounted position thereof, and a spring element loading the slide means in a direction toward the respective guide rail and the spring element also exerting a force on the slide means in a direction toward the sun shade.

2. An open roof construction as claimed in claim 1, wherein the slide means is shiftable substantially in the plane of the sun shade, and the spring element comprises a rod-like spring between the slide means and the sun shade.

3. An open roof construction as claimed in claim 2, wherein the rod-like spring engages the sun shade with its ends and is guided over the slide means at a greater distance from the sun shade between its ends.

4. An open roof construction as claimed in claim 2, wherein the slide means comprises an elongated pad having parallel longitudinal sides, the pad being guided between guiding ribs on the sun shade.

5. An open roof construction as claimed in claim 4, wherein the end of the slide means facing away from the respective guide rail has a shoulder adapted to engage the end of one of the guiding ribs facing away from the guide rail so as to limit the travel of the slide means.

6. An open roof construction as claimed in claim 5, wherein the guide rail comprises a section opening in a direction to the sun shade and having a lower substantially horizontal flange for supporting the sun shade and an upper substantially horizontal flange having an upwardly turned end portion with which the slide means slidably engages.

* * * * *